FIG. I.

May 10, 1955  J. A. WEIDENHAMMER  2,708,267
RECORD CONVERSION SYSTEM
Filed Dec. 31, 1953  10 Sheets-Sheet 3

INVENTOR.
JAMES A. WEIDENHAMMER
BY
ATTORNEYS

May 10, 1955  J. A. WEIDENHAMMER  2,708,267
RECORD CONVERSION SYSTEM
Filed Dec. 31, 1953  10 Sheets-Sheet 6

INVENTOR.
JAMES A. WEIDENHAMMER
BY P. E. Henninger
ATTORNEYS

May 10, 1955 — J. A. WEIDENHAMMER — 2,708,267
RECORD CONVERSION SYSTEM
Filed Dec. 31, 1953 — 10 Sheets-Sheet 7

INVENTOR.
JAMES A. WEIDENHAMMER
BY P. E. Henninger
ATTORNEYS

May 10, 1955     J. A. WEIDENHAMMER     2,708,267
RECORD CONVERSION SYSTEM

Filed Dec. 31, 1953     10 Sheets-Sheet 8

INVENTOR.
JAMES A. WEIDENHAMMER
BY P. C. Henninger
ATTORNEYS

SS

-AND

CF<sub>CH</sub>

INVENTOR.
JAMES A. WEIDENHAMMER
BY
ATTORNEYS

May 10, 1955     J. A. WEIDENHAMMER     2,708,267
RECORD CONVERSION SYSTEM

Filed Dec. 31, 1953     10 Sheets-Sheet 10

*INVENTOR.*
*JAMES A. WEIDENHAMMER*
BY
*ATTORNEYS*

United States Patent Office 2,708,267
Patented May 10, 1955

2,708,267

RECORD CONVERSION SYSTEM

James A. Weidenhammer, Poughkeepsie, N. Y., assignor to International Business Machines Corporation, New York, N. Y., a corporation of New York Application December 31, 1953, Serial No. 401,666

18 Claims. (Cl. 340—174)

This invention relates to a record conversion system adapted to read records from one record medium and to reinscribe such records in a different record medium.

In its more particular aspect the invention relates to a record conversion system having as a principal component a saturable magnetic core buffer storage matrix with a parallel, high current output suitable for direct operation of reproducer control magnets used in card punches or printing devices. A serial input to the buffer storage matrix adapts the same for use in the magnetic tape-to-card or magnetic tape-to-printer system to which this invention pertains.

The system herein is designed to process data read from magnetically recorded tapes in a tape drive unit, such as that shown in my prior application for patent, Serial No. 290,396, filed jointly with Walter Buslik on May 28, 1952 for Tape Feed Mechanism. The system is adapted to supply the processed data to a reproducing device such as a modified I. B. M. Type 523 card punch which is of the kind shown in C. D. Lake Reissue Patent No. 21,133.

It is a specific object of this invention to provide a saturable core buffer storage system for a data converting device of the kind described.

It is a further object of the invention to utilize a single set of thyratrons, both as storage core output means for impulsing reproducer control magnets and as input pulsing means for one dimension of the saturable core storage matrix.

It is a further object of the invention to provide a simple form of output amplifier for each of the output thyratrons which are fed by the core matrix.

It is a further specific object of the invention to provide a two dimensional, saturable core storage matrix which includes additional cores used in conjunction with the output-input amplifiers and thyratrons for effecting the serial stepping of the core from one column to the next during the entry of data into the core for storage therein.

It is a further object of the invention to provide for the use of low powered vacuum tubes using step-down transformers for core pulsing.

Additional important objects of the invention will appear as the description thereof proceeds in connection with the drawings forming a part hereof and in which drawings:

Fig. 1 is a simplified circuit diagram principally in block form, showing the input and output circuits of the core storage matrix;

Figs. 2, 3, 4 and 5 constitute a circuit diagram of the entire conversion system, this diagram being principally in block form, and showing at the bottom of Figs. 4 and 5 the arrangement of the core matrix;

Figure 4:
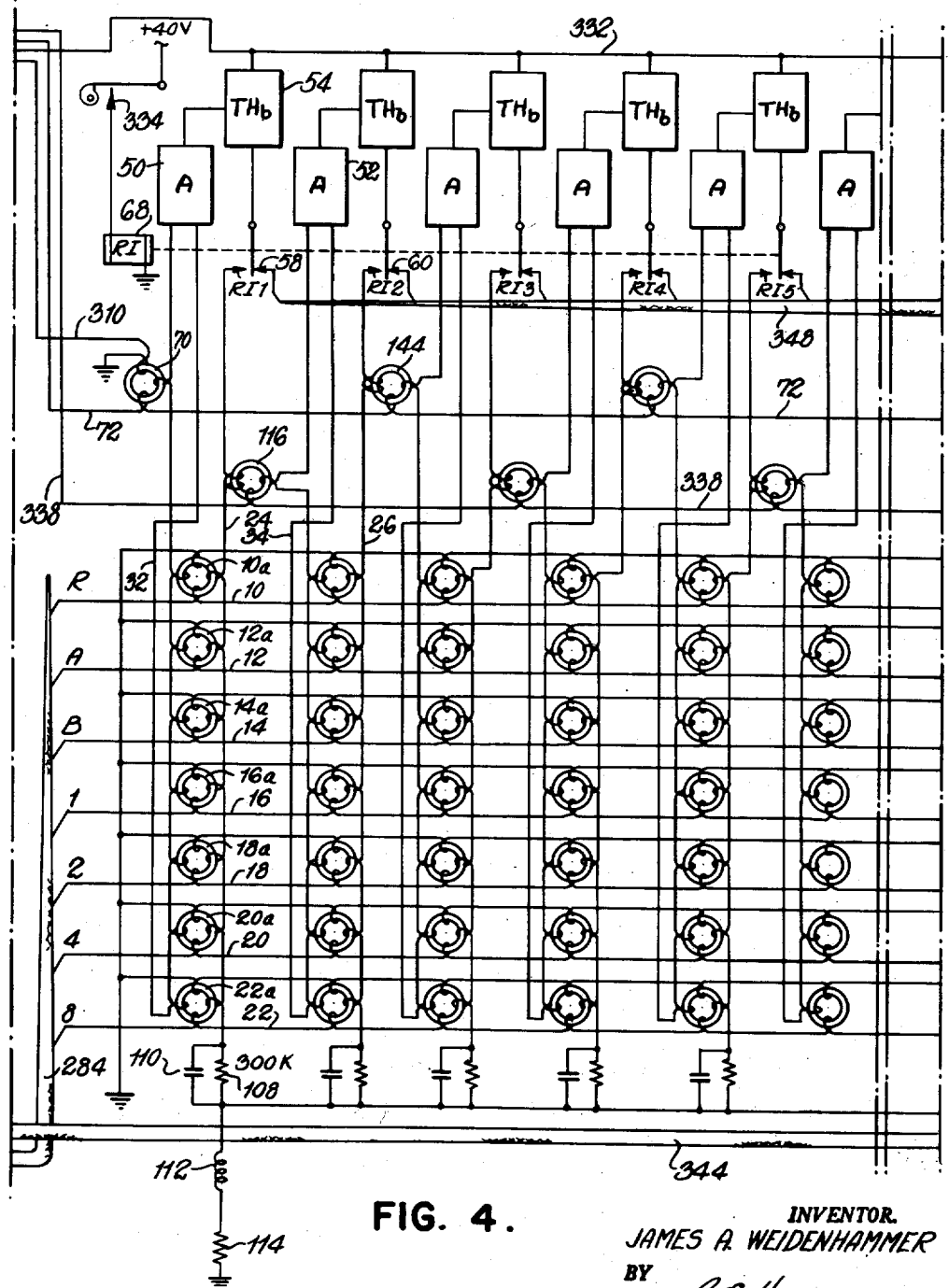
Figure 5:
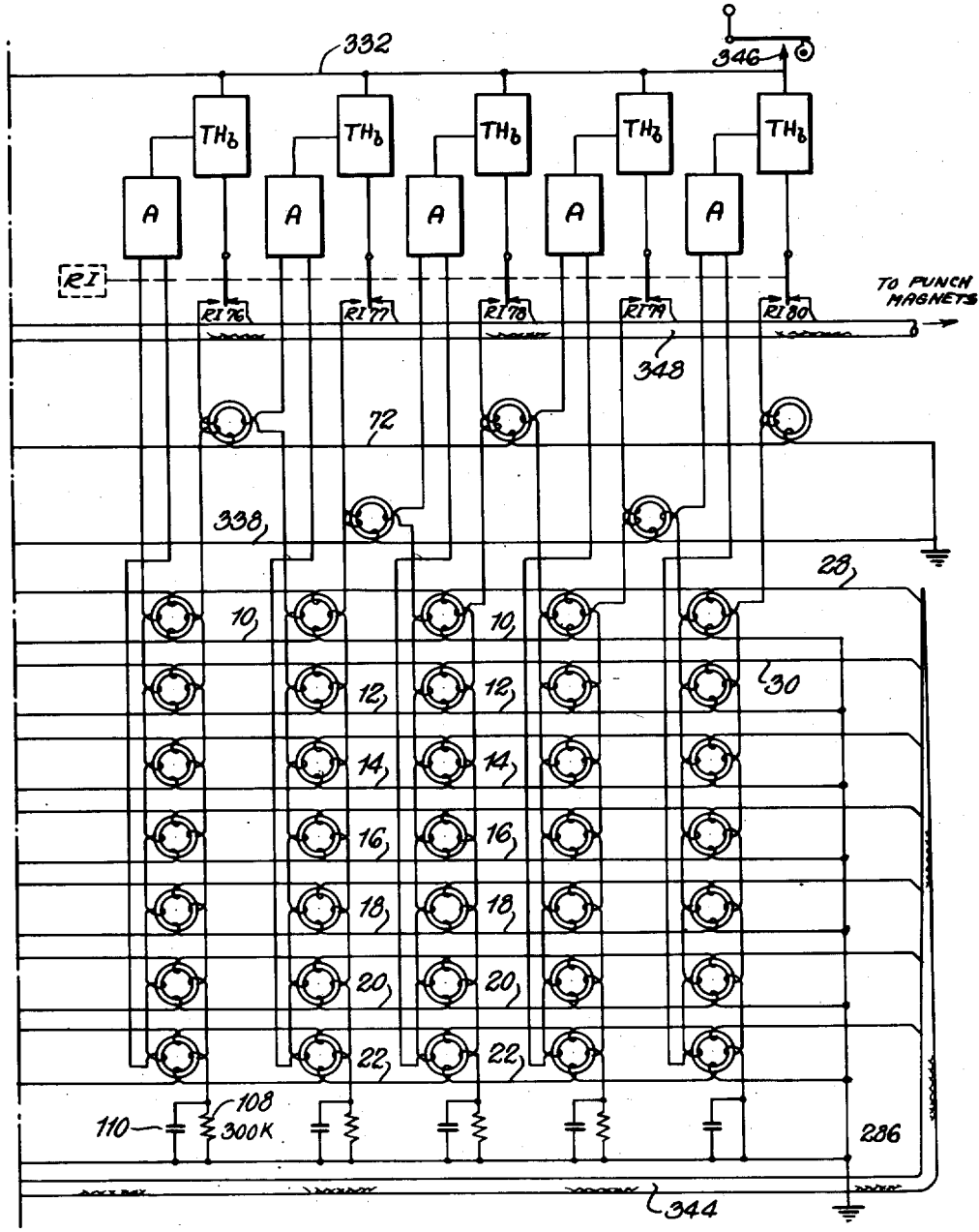

The core matrix shown in Figs. 4 and 5 uses ferrite cores, General Ceramics and Steatite No. F-291, .090 inch outside diameter, material No. 1118.

The core material posseses high retentivity and preferably has a hysteresis characteristic essentially rectangular in shape, i. e. having residual flux densities which are relatively large percentages of the original flux densities present under magnetomotive forces. These magnetic cores can be equipped with electrical winding thereon which, in response to voltage pulse signals applied thereto, may cause the magnetic cores to be momentarily saturated and thus caused to reside in a static residual magnetism state in one flux direction or the other; each state may therefore be representative of one binary number or the other. Each of the cores is therefore a binary element and may form a part of a larger binary system such as the storage matrix herein which is capable of manipulating information by virtue of the two-condition property of the cores. To change the residual flux direction, and thus the data represented by any core, it is only necessary to supply a short surge of magnetomotive force in the sense opposite to the original flux direction by means of an electrical pulse applied to one of the windings around the core. When the static flux direction in one of these cores is changed, a voltage induced in another winding thereon connected to a winding on a second core may cause a magnetomotive force in the second core to change the static flux direction in the second core. This fact is availed of herein to facilitate the entry of data into the core storage device herein. However, when a magnetomotive force surge is applied to one of these cores in the same direction as the original static flux direction, very little change in flux within the core takes place, and therefore no transfer of data from the storage matrix will result.

The seven bottom rows of the matrix contain the data storage cores, each storing one binary bit, seven binary bits per column corresponding to the seven channels of the magnetic tape on which the data may be recorded, for example, in modified binary form. The seven channels as indicated in Fig. 4 represent the redundancy bit channel R, the zone channels A and B and the binary values –1–, –2–, –4– and –8–. The two upper rows of the matrix have similar cores in alternate columns which are used for stepping the matrix from one column to the other. All windings through the cores are single turn, except for one set of vertical windings on the stepping cores, where two turns are used. A fundamental understanding of the invention can be obtained from the following general description, read in light of Fig. 1 of the drawings when supplemented by reference to the core matrix arrangement of Figs. 4 and 5.

Figure 1:
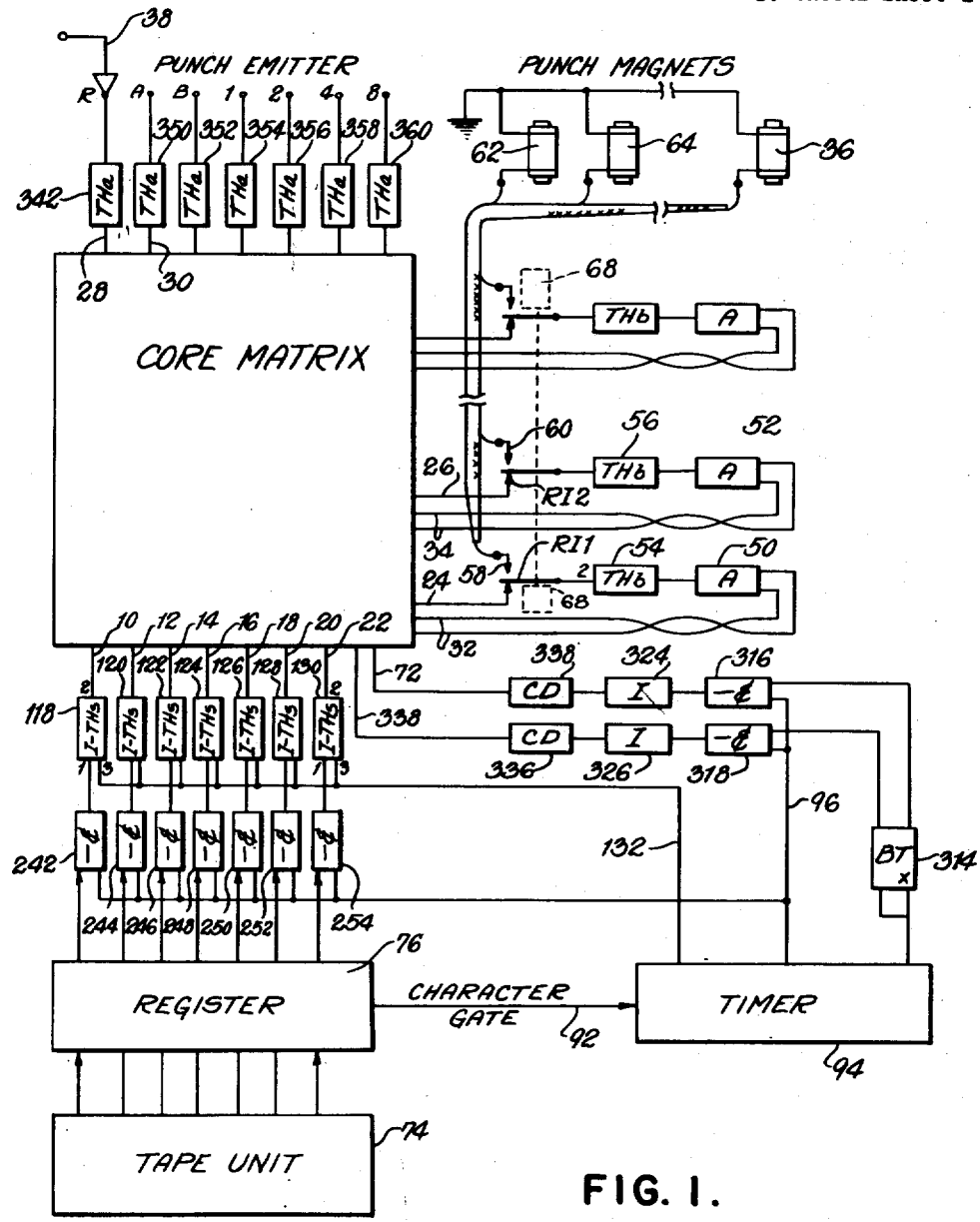

Conventional two dimensional coincidence switching is used to set the magnetic state of the cores to an "on" condition when reading data thereinto. For the cores used, simultaneous currents of about .65 ampere on a horizontal line such as the lines 10 through 22 (Figs. 1 and 4) and a vertical line such as the lines 24, 26, etc., are capable of changing the state of only one core, this change taking place in the core at the intersection of two charged lines, all other cores being unaffected. Read-out is obtained by sending a current of 1.3 amperes through one of the windings 28, 30, etc. (Figs. 1 and 5). Because of the opposite polarity, any core on the line being pulsed for read-out, which was previously saturated to an "on" condition, is reset to zero. This reset to zero induces a read-out voltage of about .3 volt on the corresponding read-out windings 32, 34, etc. (Figs. 1 and 4). By virtue of the rectangular hysteresis loop of the ferrite material, a magnetizing force of 1.3 ampere turns is sufficient to reverse the magnetic state of a core, while half that force has no significant effect.

In converting information from magnetic record tape to punched record cards, the card punch of the aforesaid Lake patent runs at its normal rate of speed of 100 cards per minute. During the normal interval between cards, when no card is in position to be punched in the punching station, the tape drive unit of the aforesaid Weidenhammer et al. application is started. The reading heads in the tape unit 74 read one unit record and the tape drive then stops before the next following card is in position to be punched. Since the record is read from the tape in serial order, it is entered into the core storage in column-by-column order. When the next card passes through the punching station, the information stored in the core matrix is used to control the punching operation by energizing the punch control magnets 36, etc. (Fig. 1). The punching operation is performed in row-by-row order, requiring a parallel, substantially simultaneous source of high current outputs on a plurality of channels equal to the number of card columns to be punched.

Since the operation of reading out of the core matix storage is the simpler operation, it will be described first. Assume that the state of certain cores in the matrix of Figs. 4 and 5 has been set "on" to represent a binary number, while the remaining cores are not saturated and therefore represent the absence of a binary number by their zero condition.

In the disclosure herein the punching device and the core matrix have been arranged to process and punch into record cards data which is inscribed on the magnetic tape in the modified binary code known as the excess-three code. Consequently, the core matrix has only the necessary positions for handling the code bits of the excess-three code plus a redundancy check bit. In my concurrently filed application entitled Electronic Record Conversion System, Serial No. 401,622 I have shown a data converting system which is adapted to accept the excess-three code and translate the same into the Hollerith code. The present system is adaptable to a similar treatment by the addition of a code translating matrix, such as shown in my aforesaid concurrent application. In such event the number of core storage positions in a given column of the storage matrix would be expanded to twelve positions and the number of columns would embrace eighty, so that the index point positions of storage in the matrix would correspond to the index point positions of the well known record card used in the Hollerith punch card system.

The 12's row of holes in the card may, according to the instant example, represent data stored in the cores on the horizontal line 10 of Figs. 4 and 5, the 11's row of holes may in like manner represent the data stored in the cores on the horizontal line 12 of these figures, etc.

Figure 6:
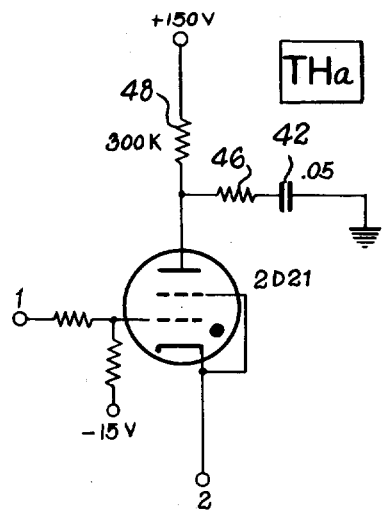
Fig. 6 illustrates both the block symbol and the detailed wiring diagram of a thyratron utilized in the read-in circuits of the core matrix.

When the card punch is in position to punch the 12's row of holes in a card, a punch emitter 38 (Figs. 1 and 3) fires the thyratron 342. A conventional self-extinguishing circuit is used as shown in Fig. 6. The capacitor 42 (Fig. 6) is charged to +150 volts before the thyratron fires. Upon firing of the thyratrons, the current from the tube cathodes through the line 28 of the matrix is initially (150—10)/R, if 10 volts is taken as the voltage drop in the thyratron. By making the resistor 46 (Fig. 6) 100 ohms, a 1.3 ampere current is sent through the winding 28 (Fig. 5). After the capacitor 42 (Fig. 6) discharges sufficiently, the 300,000 ohm resistor 48 limits current to a value less than that necessary to maintain ionization of the thyratron and conduction ceases, at which time the capacitor 42 recharges.

The current through the winding 28 of the matrix resets to zero any cores in the first storage row containing a stored bit, and such resetting induces a read-out voltage on the columnar read-out signal lines 32, 34, etc. Each of these signal lines is connected by a twisted pair to amplifiers 50, 52, etc. This produces a 60 volt positive pulse at the amplifier tube outputs, pins 9 or 7 (Fig. 7), sufficient to fire a punching thyratron directly.

Figure 8:
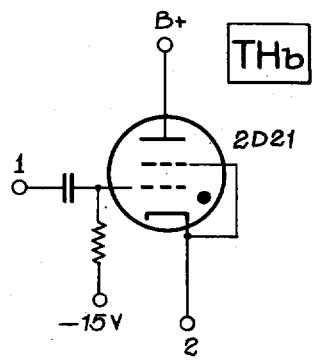
Fig. 8 illustrates both the block symbol and the detailed wiring diagram of the thyratrons utilized in the core matrix read-out circuits.

Thus, in Fig. 1, a thyratron unit 54, 56, etc. is fired for each matrix signal winding carrying an output signal. The thyratron circuits 54, 56, etc., are shown in Fig. 8. The amplifier signal is applied to pin 1 and fires the tube, conducting current from a master circuit breaker in the punch, through the plate of the 2D21 tube, its cathode and its output pin 2 to a relay contact, such as 58, 60, etc., to the corresponding punch control magnets 62, 64, etc., to punch a hole in the card.

Opening of a mechanically operated circuit breaker in the punch at a suitable time opens the thyratron voltage circuit to permit de-ionization of the thyratrons following the punching of the 12's row of holes. At 11 punching time, the above procedure is repeated, except that the punch emitter 38 fires the next thyratron 350, thus resetting and reading the cores that were saturated in the second row of the core matrix. After seven punching operations, all storage cores in the matrix will have been reset to zero and their setting will have been printed or punched into a record card.

When reading data from a magnetic record tape into the core storage matrix, the punch relay 68 returns to its normal position, i. e. the position shown in Fig. 1, wherein the RI1—RI80 contacts are closed. This permits the amplifiers 50, etc. and the thyratrons 54, etc., which were used during read-out to the punch control magnets, to be used for column stepping in conjunction with the stepping cores of the matrix during the serial read-in of information.

As described above, parallel read-out of the matrix requires no coincident switching as a full current of 1.3 amperes was sent through the horizontal read-out windings 28, 30, etc. in succession. Since the operation of reading information into the core matrix, however, is performed serially, coincidence switching must be utilized. The procedure requires that the bits comprising the first character read from tape cause corresponding cores of the seven storage cores in column #1 of the matrix to be changed in state so that such cores will be saturated. In Fig. 4 this requires that a half value current of .65 ampere be sent through the digit entry windings 10 through 22 corresponding to the bits in the character to be entered. A simultaneous half-current through the winding 24 then sets corresponding cores in column #1 only to their saturated condition and only at the point of intersection of the winding 24 with the pulsed entry windings 10 through 22. The second character then requires pulsing of the line 26 in column #2, together with the entry lines 10 through 22 as may be required to represent the character being stored in the the second column. The matrix is set to receive the first character by setting a stepping core 70 (Fig. 4) by transmitting a full 1.3 ampere pulse through a lead 310 which constitutes a winding of the core 70. This is accomplished by logical circuitry which will be explained at a later point herein when the specific details of the circuit are described.

When the first character is sensed by the reading heads in the tape drive unit 74 (Figs. 1 and 2), it enters a trigger register 76 (Fig. 1). The setting of the register 76 conditions one input of —AND circuits 242 through 254 to a minus value in those positions corresponding to the bits of the character read from tape. Upon receipt of a character in the register 76, a Character Gate Pulse is transmitted on line 92 to start timer circuits 94. These timer circuits will be described in greater detail at a later point herein, and it is sufficient to note at the present time that the timer circuits are logical arrangements of single shot multivibrators which emit a sequence of suitably timed control pulses during each character entry operation.

After a delay which allows time for normal tape "skew," an output line 96 (Fig. 1) of the timer emits a negative pulse which is transmitted to a pair of—AND circuits 316 and 318. For the first character, a binary trigger 314 maintains one input of the —AND circuit 316 negative, so that the timer pulse causes its output to become negative. This signal is inverted by an inverter 324 to operate a core driver circuit 338.

In Fig. 1 the output of the core driver 338 is applied to the line 72 of the matrix. In Fig. 4 it is seen that line 72 is a winding on the core 70 and that a pulse on the line 72 will consequently reset the core 70 which was previously saturated. A signal appears on the winding 32, connected to the column #1 amplifier 50 and through it to the thyratron 54. The resultant firing of the thyratron 54 transmits a current through the normally closed contact RI1 of the punch relay 68 to the winding 24 of the matrix. This circuit passes through the cores in column #1 and through a self-extinguishing network consisting of a 300K resistor 108 and a .05 microfarad capacitor 110, a pulse shaping choke 112 and a current limiting resistor 114. The resistor 114 and the choke 112 are designed to limit the peak of the current pulse through the core winding to .65 ampere. There is, therefore, a half-current value for the storage cores of column #1 on the winding 24, which will set into an "on" condition cores only in coincidence with another half-current on one of the horizontal winding leads 10, etc. The winding 24 makes two turns through the column #2 stepping core 116, however, and therefore sets the core 116 "on" in preparation for the second character which will be stored in the second column of the matrix.

Figure 9:
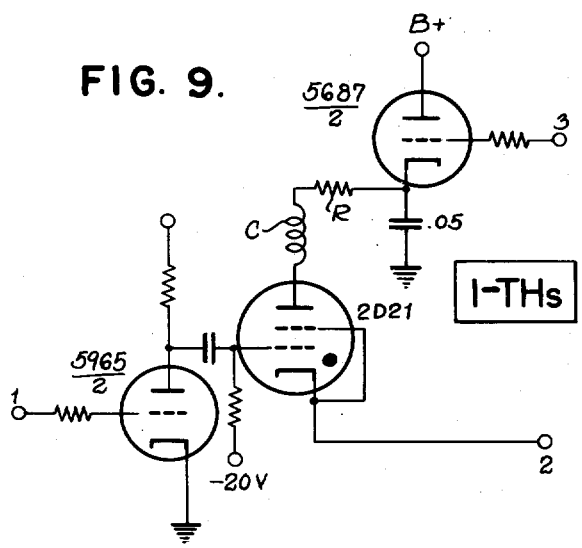
Fig. 9 illustrates both the block symbol and the detailed wiring diagram of the digit entry thyratrons and their associated inverters.

While the half-current for column #1 is being provided as described above, the digit selection half-current is being provided under control of the input register 76. The negative timer pulse on the timer output 96 (Fig. 1) also proceeds to the —AND circuits 242 through 254 causing a negative output from those —AND circuits corresponding to the bits representative of the character. Each —AND circuit in the group 242—254 is connected to an inverter-thyratron circuit 118 through 130. This circuit is as shown in Fig. 9. A negative voltage applied to pin 1 cuts off the inverter, supplying a positive pulse to fire the 2D21 tube of the thyratron. At this point input 3 is held negative by the timing output on a line 132 (Fig. 1) so that the cathode follower tube connected to it does not furnish current to the thyratron. Instead, the thyratron discharges the .05 microfarad capacitor previously charged to a large plus voltage by the cathode follower, and deionizes when the capacitor is discharged. This circuit proceeds from the thyratron cathode via output connection 2 to the corresponding digit entry winding 10 through 22 of the core matrix. The currents are limited to a .65 ampere peak by the resistance R and a choke coil C in Fig. 9. The coincidence of these digit half-currents with the previously described column half-current sets "on" those cores in column #1 at the intersection of the selected digit lines 10—22 with the column entry line 24.

Before entry of the second character, the timer circuit 94 raises the input 3 of the inverter-thyratron units (Fig. 9) not sooner than 100 microseconds after firing of the thyratrons, to allow sufficient de-ionizing time to avoid restriking. This recharges the capacitors in readiness for the next character. In addition, the binary trigger 314 (Fig. 1) is pulsed once to trigger it to the reverse of its previous condition.

Receipt of the second character by the trigger register 76 initiates a similar sequence of events, except that, owing to the reverse status of the binary trigger 314, the —AND circuit 318, the inverter 326 and the core driver 336 are operated. This sends a current through the stepping winding 338 of the matrix. In Fig. 4, it is seen that the core 116, previously saturated, is now reset to zero, producing a signal pulse on winding 34 which, in the usual manner, causes the column #2 amplifier 52 and thyratron 56 to function, providing a half-current on the winding line 26. This, in conjunction with the previously described half-currents controlled by the register 76, sets up storage cores in column #2, as well as setting the stepping core 144 by virtue of the double turn of the winding 26 therethrough.

The operation of entry for further columns is repetitive and should now be evident, it being understood that alternation of the stepping lines 72 and 338 takes place on successive characters under control of the binary trigger 314.

The pulses on the digit lines and on the column lines during entry must coincide closely in time. In practice, circuit delays in the amplifier and column thyratrons tend to make the column pulses about two microseconds later than the digit pulses. It has been found that the provision of R. F. chokes in the pulsing circuits produces rounded pulses of sufficient duration to make coincidence of the peaks non-critical.

For a more specific understanding of the details of the system, reference should be made to Figs. 2 through 5 in conjunction with the following description. When a tape start cam 146 (Fig. 3) closes its associated contact, a positive 40 volt pulse is applied to the terminal 148. This causes the left side of a Read Key Trigger 150 to conduct. The normal condition of the Read Key Trigger 150 is that in which it conducts on the right side, as indicated by the small "x" at the right lower corner of the block representing the component. The specific nature of the key trigger can be seen by reference to Fig. 10 and a brief description of the same will follow hereinafter. The resulting negative shift at pin 8 of the Read Key Trigger 150 turns on a Tape Run Trigger 152. Shortly thereafter a cam 154 will close a contact and place a +40 volt pulse on a terminal 156 which resets the Read Key Trigger 150 to its original condition.

The setting of the Tape Run Trigger 152 causes the voltage at its output pin 8 to rise, and this causes a cathode follower 158 to conduct so that its output pin 6 shifts from its normal −30 volt potential to a +10 volt output. The nature of the Tape Run Trigger 152 and that of the cathode follower 158 may be seen in Figs. 11 and 12, respectively.

The +10 volt output of the cathode follower 158 is impressed on a Tape Run Lead 160, which causes the tape circuits to start the tape to run through the tape reading heads in the tape drive unit 74 (Fig. 1). The control of tape movement in the tape driving unit is not a part of the present invention, and since an understanding thereof is unnecessary to a complete understanding of the present invention, the details thereof need not be considered.

The feeding of tape continues through the reading heads of the tape drive unit 74 until a complete record is sensed on the magnetic tape. In this regard it may be noted that a unit record length may be determined by the number of storage columns in the storage matrix or the storage matrix may be designed with such capacity as to accommodate any unit length records that may be presented for processing in the conversion system. The end of a record is indicated by a special character code known as a Record Mark. As we shall describe at a later point herein, detection of a Record Mark resets the Tape Run Trigger 152, causing the output of the cathode follower 158 and the Tape Run Lead 160 to return to −30 volts, stopping the action of the tape drive unit and the motion of the tape through the reading heads at a point between unit records on the tape.

Figure 2:
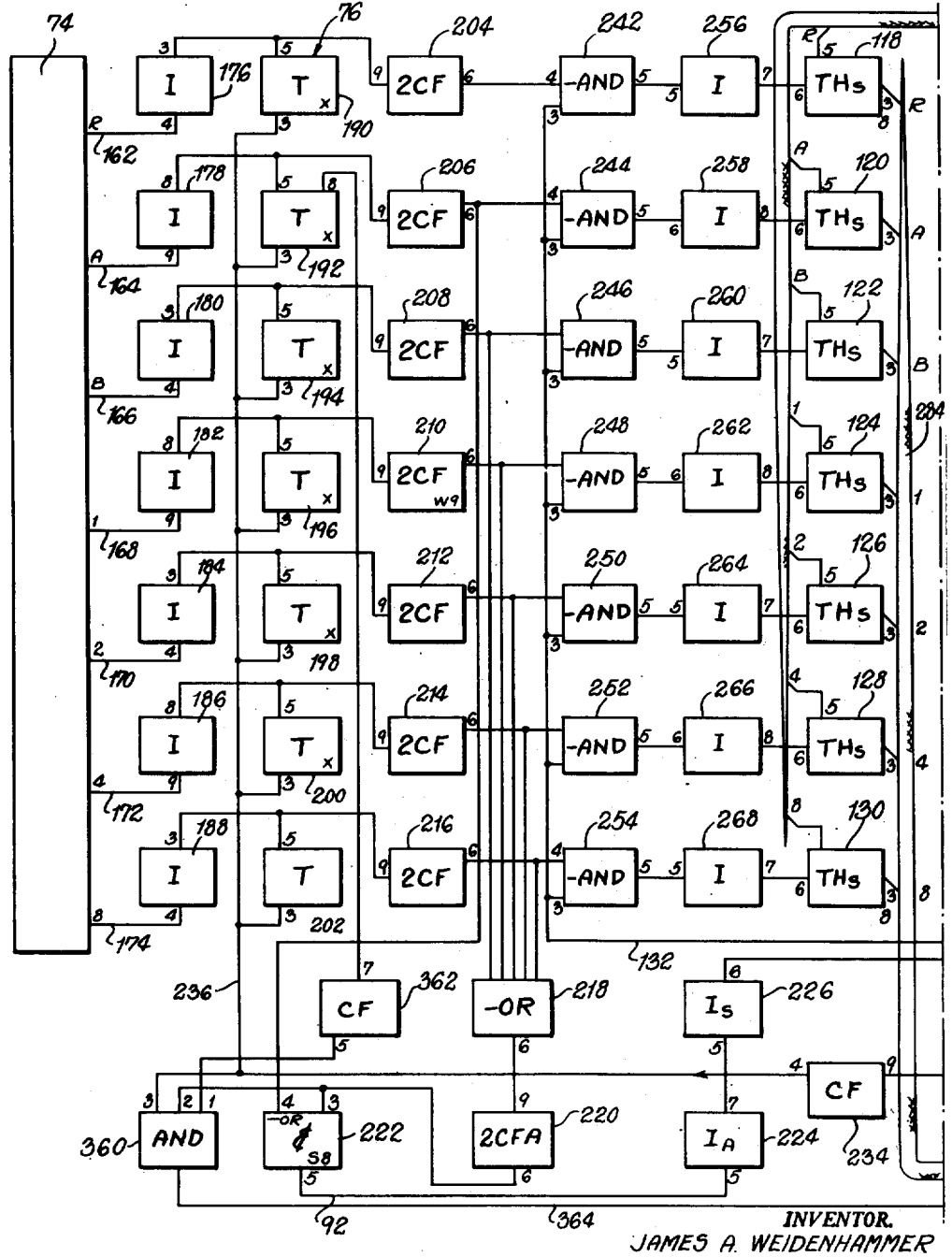
Figure 13:
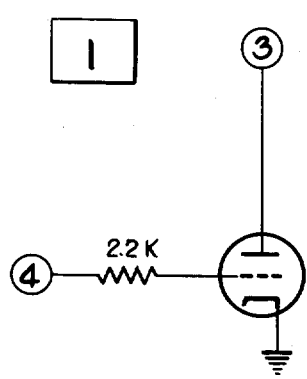
Fig. 13 illustrates both the block symbol and the detailed wiring diagram of an inverter.

As the record on the magnetic tape moves past the reading head of the tape drive unit, the first character causes signals to appear at the terminals 162 through 174 (Fig. 2). The presence of a positive bit in the character being sensed results in a +10 volt level at the corresponding terminal, all the remaining terminals remaining at −30 volts. The +10 volt signal has a duration of about four microseconds. The characters above the terminals 162 through 174 indicate the corresponding tape tracks wherein the R is indicative of a redundancy bit, the letters A and B are indicative of zonal information used in writing alphabetic data, for example, and the numbers −1−, −2−, −4− and −8− are indicative of binary code values. Thus, the digit 4, which has an excess-three code representation of bits in the −4−, −2− and −1− tracks of the tape, produces +10 volts at terminals 168, 170 and 172. Where any of the terminals receives a positive signal, the corresponding associated inverters 176 through 188 are rendered conducting. These inverters are as shown in Fig. 13. The plate pin 3 of each inverter is connected to the left plate of an associated trigger 190 through 202. The triggers 190 through 202, which are in accordance with the circuit shown in Fig. 11, comprise the input register 76 (Fig. 1). The input register is designed to temporarily store each character as the bits thereof are received from tape, and it is rendered necessary by the difficulty that the bits comprising a tape recorded character may be read by the reading heads in a somewhat serial manner due to "skew" resulting from mechanical misalignments and the like, and the fact that the storage matrix should receive all bits comprising a character simultaneously, i. e. in parallel order.

The triggers 190 through 202 comprising the register 76 are all normally reset with the right side of each thereof conducting, as indicated by the small "x" on the block diagram of Fig. 2. When an associated inverter 176 through 188 conducts, it causes the corresponding trigger to shift its conducting state to the left side by conventional pull-over action. When any trigger of the input register 76 is turned "on" by a character bit in this manner, the voltage at its output pin 5 shifts in a negative direction from a previously maintained +140 volts to +50 volts, since the left side of the trigger pair conducts. This pulse is transmitted from each trigger to an associated cathode follower of the groups 204 to 216, causing the output pin 6 of an affected cathode follower to shift from +10 volts to −30 volts. The cathode follower 204 emits the pulse representative of the redundancy bit, and since the full processing of the redundancy bit for the purpose of checking errors is not a part of this invention, the presence thereof may, for all practical purposes, be ignored.

Figure 15:
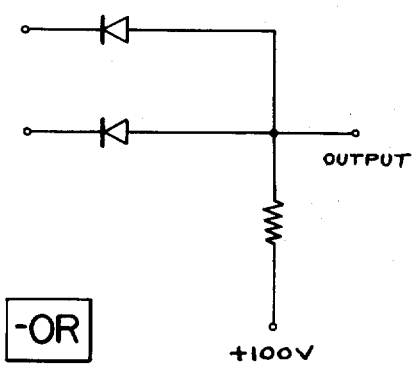
Fig. 15 illustrates both the block symbol and the detailed wiring diagram of a —OR coincidence circuit.

The cathode follower circuits 206 through 216 are all connected to a five-way −OR circuit 218, which may be in accordance with the disclosure in Fig. 15. Thus, if any one or more of the triggers 192 through 202 is turned on, the resulting negative shift of one or more inputs to the −OR circuit 218 causes a negative shift at its output pin 6, since the output of a −OR circuit is equal to the lowest input voltage. The output of the −OR circuit 218 is fed into a special cathode follower 220 which may be in accordance with the circuitry of Fig. 16. The output of the cathode follower 220 constitutes one input of a −OR circuit 222. The other input of the −OR circuit 222 is controlled by the trigger 192. The −OR circuits 218 and 222 are in effect together a six-way −OR circuit having as inputs the outputs of triggers 192 through 202. The two circuits are separated because the output of the −OR circuit 218 is useful also in determining Record Marks, as to be described later.

The final output of the −OR circuit 222 is normally +10 volts, since all inputs are +10 volts. Any one of the triggers 192 through 202 turning "on" causes a negative shift to −30 volts. This negative output is used as a Character Gate signal, and indicates that the first bit of a character has been received from tape. It will be noted that the redundancy track terminal 162 is not included in the character gate circuit because a redundancy bit cannot properly occur alone.

The negative Character Gate signal on the lead 92 controls a pair of inverters 224 and 226 which are connected in series, producing a change in the signal level from +150 volts to +50 volts at the output pin 6 of the inverter 226. This negative going signal enters pin 3 of a single shot Skew Delay multivibrator 228, which is in accordance with the circuitry shown in Fig. 17, and which may be referred to as the Skew Delay Single Shot. The Skew Delay Single Shot multivibrator 228 produces a single, fixed duration pulse at its output pin 6. This pulse rises from +50 volts to +150 volts, remaining at +150 volts for 60 microseconds, then returning to +50 volts. The fall of the pulse of the Skew Delay Single Shot multivibrator 228 sixty microseconds after the Character Gate signal has arrived, starts a Storing Single Shot multivibrator 230 and a Charging Single Shot multivibrator 232 to initiate the storage of the bits representative of the character, having allowed a so-called "skew" delay to permit the lagging bits of a character to enter the trigger register 76.

The Storing Single Shot multivibrator 230 has an output signal which is similar to that of the Skew Delay Single Shot multivibrator 228 but of only ten microseconds duration. The output pin 6 of the Storing Single Shot multivibrator 230 is connected to the input pin 9 of a cathode follower 234 (Fig. 2), causing the output pin 4 of the cathode follower 234 to rise from −30 volts to +10 volts for a duration of ten microseconds. The fall of this pulse is used to reset all the triggers in the input register 76, through its connection to pins 3 of each of these triggers by way of a lead 236 once storage of the character has been previously completed by means to be described hereinafter. The input register 76 is then conditioned for reception of the next following character.

To understand the entry of a character into the core memory matrix, reference should be made to Figs. 4 and 5 of the drawings. With the exception of the cores on the lines 72 and 338, each ring core has four single turn windings passing through it. In Fig. 4 the cores of the first column are indicated by the reference numerals 10a through 22a. As mentioned in the summary description of the operation, the cores 144, etc. on line 72 and the cores 116, etc. on line 338 may be referred to as stepping cores. Thus the cores 116, 144, etc. are used to step the matrix from one column to the other, while the cores 12a through 22a in each column are used for the storage of one column of information, i. e. a character, while the core 10a is used to store a redundancy bit whenever required. It has been stated hereinbefore that all of the cores are ferrite material with a substantially rectangular hysteresis loop. No attempt is made herein to describe the fundamental principle of saturable cores, since this information is well known and fully described elsewhere. It is sufficient to say that while a total magnetizing force of 1.3 ampere turns will fully magnetize the core material in either direction, one half of this value is insufficient to change the residual state of the material appreciably from its last previous state by reason of the rectangular hysteresis loop.

A two dimensional coincidence system is used for read-in, whereby a magnetizing current of half value, or .65 ampere, is simultaneously applied to a column winding such as the line 24 and one or more of the digit windings such as 16, 18 and 20, for example. The only cores to have their state changed will then be those at the intersection of the impulsed windings. Thus, any of the 560 cores represented in a 7 x 80 matrix may be magnetized to store a bit by suitable control of the seven digit lines and the 80 column entry lines.

Figure 7:
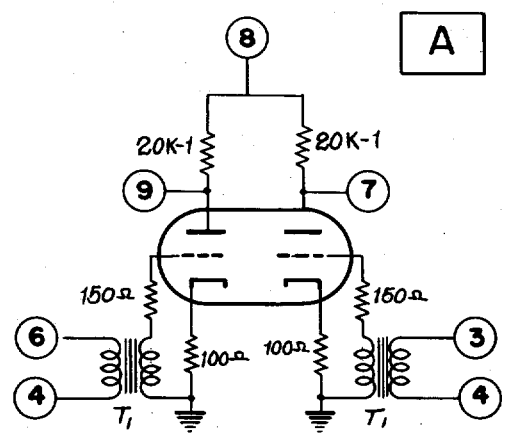
Fig. 7 illustrates both the block symbol and the detailed wiring diagram of an amplifier used to feed the thyratrons in the core matrix read-out circuits.

To read-out the stored values in a parallel fashion, i. e. all the R's simultaneously, then all the A's etc., a full current of 1.3 amperes is directed through the winding 28 (Fig. 5) for the R's, the winding 30 for the A's, etc. This current is opposite in direction to the entry currents and therefore resets all cores in these rows that have been previously charged to an "on" condition. The remaining cores are unaffected, remaining in their previous state. The change of flux in a core that is reset as above induces open-circuit voltage of about .3 volt in a single turn sensing winding such as 32 (Fig. 4), of which one is provided in each column. The two ends of each sensing winding are connected to an individual amplifier such as shown in Fig. 7.

Each amplifier unit 50, 52, etc. embodied in the system accommodates two complete channels of amplification. Thus, in Fig. 7 a sensing winding is connected to pins 6 and 4, and a second winding is connected to pins 3 and 4. These pins are connected to the transformer primary, consisting of a few turns of No. 22 enameled wire wound on a standard 10 mh. iron core R. F. choke. The normal choke winding of many turns serves as a secondary connected, as shown, in the grid circuit of the triode. The triode is normally conducting. The sensing pulse is stepped up by the transformer, resulting in a 4 volt negative signal at the tube grid. A 60 volt positive pulse results at the triode plate which, though of short duration, is sufficient to fire an associated thyratron 54, 56, etc. The core output signal pulse is less than one microsecond long. The inductance and distributed capacity of the transformer circuit are such that the signal applied to the tube grid is more than two microseconds long. This results in more gain in the triode stage, as well as longer firing pulses for the thyratrons.

The connections of input and output circuits to the core matrix are shown in Figs. 4 and 5. In these figures it is seen that 80 thyratrons such as 54, 56, etc. are provided. These thyratrons are used during core read-out to provide the 80 punching magnets 36, 62, 64, etc. (Fig. 1) with the necessary high current operating pulses of about .25 ampere. The thyratrons which are in control of the punch magnets are in accordance with the circuit shown in Fig. 8.

As noted in the statement of the objects, an important feature of the present invention is that the same thyratrons 54, 56, etc. and associated amplifiers are used during core read-in under control of the stepping cores to provide sequential or serial entry. This results in a major saving in equipment in a serial-input, parallel output device of this nature, since an alternate method for serial stepping of a core matrix uses a separate core stepping ring having a thyratron and a multi-turn toroidal core for each columnar position.

Relay points RI1 through RI80 switch the thyratron cathode circuit to the matrix column winding during entry into the cores and the relay points 58, 60, etc. switch the thyratron cathodes to the punch magnets during read-out.

The operation of the input register (Fig. 2) by pulses from the tape reading heads in the tape drive unit 74 was previously described. The operation of storing the input register settings into the core matric proceeds as follows. It was shown that the Storing Single Shot multivibrator 230 (Fig. 3) emits a positive going pulse of 10 microseconds duration at the end of the "skew" delay period for each character received from the tape. This produces a negative going pulse at the output pin 8 of an inverter 238, resulting in a drop from +10 volts to −30 volts for 10 microseconds at the output pin 6 of a cathode follower 240 whose input is the pulse from the inverter 238. This signal is coupled to pins 3 of a series of −AND circuits 242 through 254 (Fig. 2). The other inputs to the −AND circuits 242 through 254 are conditioned to be at −30 volts whenever the corresponding input register trigger is turned "on." Thus, the output pin 5 of any of the −AND circuits 242 through 254 will drop from +10 volts to −30 volts only in those −AND circuits corresponding to a code bit received from the tape reading heads in the tape drive unit 74, since the −AND circuit is at the level of its highest input. The −AND circuits 242 through 254 are formed according to the circuitry shown in Fig. 18 and their nature will be described more particularly hereinafter.

Whenever a negative output results from one of the −AND circuits in the group 242–254, the corresponding inverter of the group 256 and 268 rises from 50 volts to 150 volts. The output from the inverters 256 through 268 will fire associated thyratrons 118 through 130. The respective inverter thyratron pairs are according to the circuit shown in Fig. 9 of the drawings.

Current from the thyratron cathodes leaves the output pin 3 of each thereof in whose circuit a bit was present and passes through a cable 284 which conducts the respective pulses to the inputs of the matrix (Fig. 4), entering corresponding matrix terminals R, A, B, −1−, −2−, −4− and −8−, thence passing through the core matrix digit lines 10 through 22 to ground at terminal 286 (Fig. 5). These currents are limited to .65 ampere by means to be described, and provide for set-up of the proper digit core as each character is received. A further half-current is necessary on one of the column windings to complete set-up of the corresponding cores in the desired column of the matrix.

Figure 19:
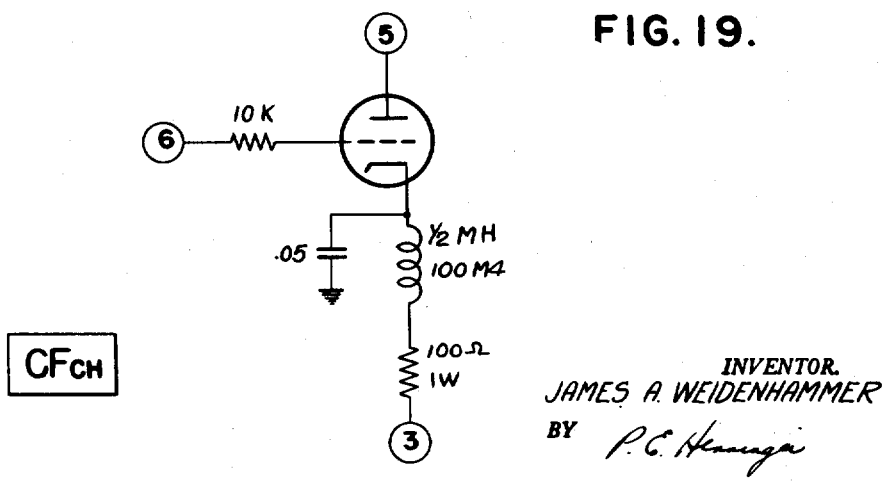
Fig. 19 illustrates both the block symbol and the detailed wiring diagram of charging cathode followers utilized in the system for the emission of digit storage pulses.

To provide the necessary regulation of the digit entry currents above referred to, charging cathode followers 288 through 300 are provided. These charging cathode followers are according to the circuitry shown in Fig. 19. One half unit of the charging cathode follower circuit of Fig. 19 is provided for each of the entry thyratrons 118 through 130 (Fig. 2). In Fig. 19 the grid pin 6 is normally held at +150 volts. The pin 5 is connected to a +220 volt supply line; thus, the triode acting as a cathode follower, tends to charge the capacitor in its cathode circuit to +150 volts. The capacitor connects through a choke and limiting 100 ohm resistor to pin 3, thence to plate pin 5 of a digit entry unit such as 118 (Fig. 2), for example. When a digit entry thyratron fires as described above, the capacitor of the charging cathode follower discharges through the thyratron to furnish the storage current, suitably limited and shaped by the choke and the 100 ohm resistor. At the same time the digit entry thyratrons fire, grid pin 6 of the charging cathode-follower is shifted in voltage to −30 volts for 100 microseconds, so that after the thyratron discharges the capacitor, no recharging takes place until the thyratron stops conducting and has had sufficient time to deionize. At the end of 100 microseconds the cathode follower grid is returned to +150 volts and the capacitor is recharged readily for the next digit entry.

Control of the charging cathode follower grids is as follows: The negative going signal at the end of the 60 microsecond "skew" delay produced by the Skew Delay Single Shot multivibrator 228 (Fig. 3) starts the Charging Single Shot multivibrator 232, as well as the previously described Storing Single Shot multivibrator 230. The resulting positive going pulse from the output pin of the Charging Single Shot multivibrator 232 lasts 100 microseconds. This is coupled to a special inverter 302, resulting in a 100 microsecond negative going pulse at the output pin 3 of the inverter 302, from +150 volts to −30 volts. The output pulse of the inverter 302 is connected to the grid pins 6 and 7 of the charging cathode followers 288 through 300 to produce the above described-deionizing period for the digit entry thyratrons 118 through 130.

Having produced half-currents in one or more of the digit entry lines of the matrix (Fig. 4) for each bit being read in, it is necessary to provide a simultaneous half-current on one of the column entry lines such as 24, one column at a time in serial order. The operation of the Tape Run Trigger 152 (Fig. 3) was previously described. When the Tape Run Trigger 152 is turned "on" to start the tape, the left side conducts, lowering the voltage at its pin 5. This starts a Reset Single Shot multivibrator 304, producing a 10 microsecond positive going pulse at its output pin 6. This output pulse constitutes an input to a thyratron 306, causing it to fire, and discharging a capacitor 308 connected to its plate through the pin 5. After discharge of the capacitor, the current through the 300K capacitor charging resistor is insufficient to maintain ionization of the thyratron 306 which stops conducting, permitting recharging of the capacitor 308. The discharge current from the thyratron 306 leaves its output pin 3 by way of a lead 310, which is a winding of the core 70 (Fig. 4). The lead 310 constitutes a single turn winding for the core 70, and beyond this winding the lead is grounded. The current on the lead 310 is more than 1.3 amperes and therefore charges the core 70 to an "on" condition. It will be noted that the sensing winding 32 for column #1 of the matrix also passes through the core 70.

Figure 20:
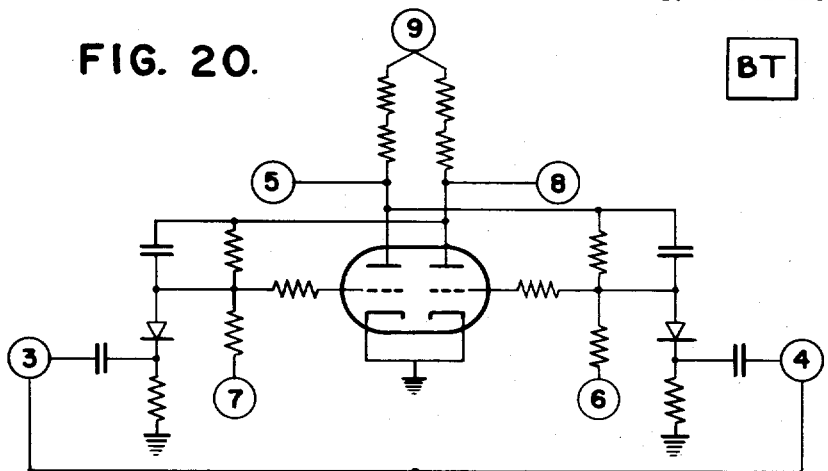
Fig. 20 illustrates both the block symbol and the detailed wiring diagram of an electronic trigger having a binary input.

Concurrently with the setting of the first stepping core the pulse from the Reset Single Shot multivibrator 304 (Fig. 3) causes an inverter 312 to conduct. This inverter is connected to one plate of a binary trigger 314 whose circuitry is in accordance with the disclosure in Fig. 20. The pulse applied to the binary trigger 314 applies the conventional pull-over principle to force the trigger to conduct on the right side, as shown, before the first character arrives from the tape when reading information into the conversion system.

Following the setting of the first stepping core 70 (Fig. 4) and the resetting of the binary trigger 314 (Fig. 3) as the tape starts, bits of a character will arrive in the input register comprising the triggers 190 through 202 (Fig. 2). The output pin of the cathode follower 240 (Fig. 3) drops from +10 volts to −30 volts, as previously described, to time the firing of the digit entry thyratrons 118 through 130 (Fig. 2). The output of the cathode follower 240 is also connected to a pair of −AND circuits 316 and 318. These −AND circuits are controlled by the binary trigger 314, through a pair of related cathode followers 320 and 322. When the output pin 8 of the binary trigger 314 is at a low potential, as when the right side of the trigger conducts, the input pin 4 of the −AND circuit 318 is at −30 volts at the same time the input pin 4 of the −AND circuit 316 is at +10 volts. Thus, when the output pin 6 of the cathode follower 240 drops to −30 volts, upon receipt of the first character from tape, the output pin 5 of the −AND circuit 318 goes to −30 volts, while the output pin 5 of the −AND circuit 316 remains at +10 volts. This causes no change at pin 7 of an inverter 324 connected to the −AND circuit 316, while the output pin 8 of an inverter 326 connected to pin 5 of the −AND circuit 318 rises in potential as a consequence of its triode being cut OFF.

The increased potential at pin 8 of the inverter 326 causes a core driver 328 to operate and thereby emit a full current pulse on its output line 72.

The core driver consists of an inverter with a pulse transformer in the plate circuit. This transformer may be constructed by using a 10 mh. iron core R. F. choke as the primary, and the secondary being 22 turns of No. 22 enameled wire wound on the choke. The resulting step-down produces a current large enough to switch cores on a single turn winding. When the triode conducts as mentioned above, the plate current passes through the primary of the step-down transformer and the output of the secondary is more than the 1.3 amperes necessary for core switching, with a reasonable plate current within the range of the vacuum triode.

The only core on line 72 (Fig. 4) of the matrix which is "on" when the first character arrives is the first stepping core 70. This is turned off by the pulse on the line 72 which is generated as described hereinbefore. The resulting flux change links with the first column sensing winding 32. This is amplified by the amplifier 50 (Fig. 4) which fires the first column thyratron 54. The plate pins 5 of the column thyratrons 54, 56, etc. are connected in common through a lead 332 and a point RIA (Fig. 3) of the read-in relay 68 (Fig. 4). The relay point RIA is connected to +150 volts.

The read-in relay 68 is energized by a punch cam contact 334 (Fig. 4) during tape read-in time. The current from the cathode of thyratron 54 (Fig. 4) passes through the normally open side of the RI1 relay contact to the column entry line 24 (Fig. 4). The current passes through the column #1 cores 10a through 22a, leaving by way of a resistance-capacitance network. The current charges the capacitor 110, current being limited by a plate resistor in the thyratron unit and the common choke coil. When the capacitor 110 is fully charged, the thyratron 54 deionizes, after which the capacitor 110 slowly discharges through the 300K resistor. Each column entry line terminates in a similar resistance-capacitance network.

The timing of the circuits is such that the above described column entry half-current coincides with the digit entry half-current pulses. Thus, cores will be set on in column #1 of the storage matrix at the intersection of the column entry line 24 and the selected digit entry lines 10 through 22, due to algebraic addition of the half-currents at these points of intersection.

By reference to Fig. 4 it will be noted that the column #1 entry line 24 makes two turns through the column #2 stepping core 116. It, therefore, follows that the column #1 entry half-current fully turns on the column #2 stepping core 116.

Figure 3:
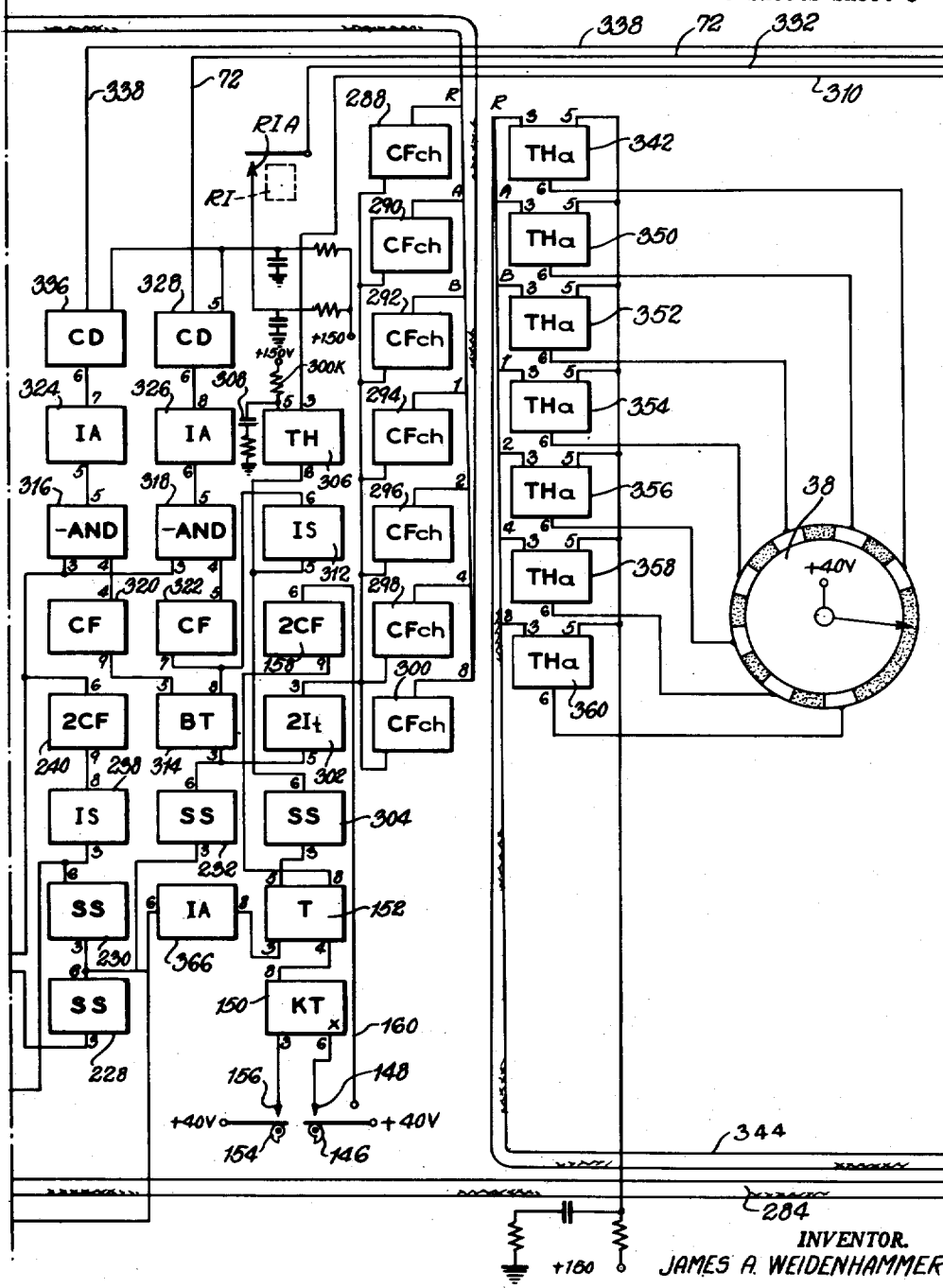

It has previously been shown that the storage of each character is accompanied by a 100 microsecond positive going pulse generated in the Charging Single Shot multivibrator 232 (Fig. 3). In addition to providing de-ionizing time for the digit entry thyratrons 118 through 130 (Fig. 2), the end of the pulse of the Charging Single Shot multivibrator 232 shifts the binary trigger 314 to the alternate state after each character is stored. Thus, after storing the first character as described above, the binary trigger 314 is shifted so that it conducts on its left side. The −30 volt output of the binary trigger 314 passing by way of the cathode follower 320 conditions input pin 4 of the −AND circuit 316 at −30 volts, while the input pin 4 of the −AND circuit 318 returns to +10 volts. When the second character is subsequently stored, core driver 336 (Fig. 3), which is the same as the core driver 328, will conduct instead of the core driver 328 as previously. This delivers a full current to the line 338 which constitutes a winding of the stepping core 116 for column #2 of the core matrix (Fig. 4). The stepping core 116 was previously turned "on" dring entry into column #1 of the matrix and is now turned "off" by the pulse on its winding line 338. The resulting signal on the column #2 sensing line 34 is amplified in the column #2 amplifier 52, which fires the column #2 thyratron to store a digit in the second column, at the same time setting the stepping core 144 for the third column in an " on" condition.

A similar procedure follows for the remaining columns, it being understood that the binary trigger 314 is alternately set and reset so that the line 72 is pulsed on odd columns and the line 338 is pulsed on even columns.

After the tape record has been stored, the card punching device reaches a position in which it is prepared to punch the 12's row of holes in a card. At this stage the cam contact 334 (Fig. 4) will open and thus allow the read-in relay 68 to deenergize, so that the relay points R1 through R80 (Figs. 4 and 5) are transferred. The emitter 38 (Fig. 3) will now deliver a pulse to a read-out thyratron 342 (Fig. 3) which fires and transmits a full current through a cable 344 to the winding line 28 (Fig. 5). This current passes through all of the cores in the first row of the matrix, and being in the reverse direction from the entry current which was an input on the winding line 10 of the first row, will reset all of the cores in the first row of the matrix which were "on". Thus, each column having data stored therein, as signified by an "on" condition of a core, transmits a signal from its sensing winding to fire the corresponding column thyratron by way of its associated amplifier. The column thyratrons are now disconnected from the +150 volt supply on the common line 332 by virtue of the fact that the relay point RIA (Fig. 3) is open. But, now the thyratrons 54, 56, etc. receive plate current on the line 332 by reason of the fact that a cam controlled contact 346 (Fig. 5) is closed and will remain closed for a suitable period for punching each row of holes. The thyratron cathodes are now connected by way of their pins 3 through the normally closed read-in relay points RI1 through RI80 to energize corresponding punch magnets by way of a control cable 348 to punch into a record card the data stored in the first row of the core matrix. After a suitable period the cam contact 346 opens and extinguishes the thyratrons 54, 142, etc.

When the system is ready to punch the second row of holes into a card, a similar sequence of events occurs, except that the emitter 38 now fires thyratron 350. This transmits a full current pulse through the second row of cores of the core matrix, causing the punching of holes in a record card in any of the columns of the second row where a core had previously been set in the "on" condition. The action is repeated as the emitter 38 successively fires the thyratrons 352, 354, 356, 358 and 360, whereby each of the remaining rows of the core matrix are read-out in successive order.

In the brief description of the invention it was intimated that the arrival of a Record Mark at the end of a unit record on tape will produce a Record Mark Signal. This signal is the output of an AND circuit 360 (Fig. 2) whose input signals are the Reset Register Signals which are the output of the cathode follower 234 and the output of the register trigger 192 by way of a cathode follower 362. When the AND circuit 360 conducts it will emit a pulse on line 364 which by way of an inverter 366 (Fig. 3) will flip the Tape Run Trigger 152 to emit a pulse on the Tape Run Lead 160 which will effectively stop the tape drive mechanism. A more specific description of the operation of the Record Mark is not necessary at this point for the reason that it does not form a part of the present invention.

It will have been noted by this time that the sequential operation of the system is controlled by the opening and closing of cam operated contacts. All of the contact operating cams are driven by the reproducing device. Therefore, the entire system is effectively under the control of the reproducer.

Certain of the components such as those described in Figs. 6 through 9, 19 and 21 have been described during the course of the foregoing description of the invention. The remaining circuits are for the most part so well known to those skilled in the art that a detailed description appears to be unnecessary. However, in the interest of a complete disclosure, the remaining component circuits shall be briefly described in the following.

Figure 10:
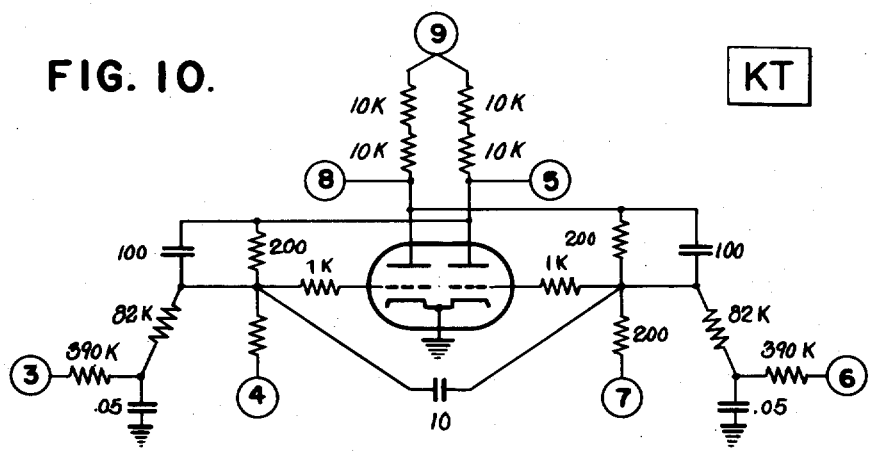
Fig. 10 illustrates both the block symbol and the detailed wiring diagram of a key trigger adapted to receive operating pulses from cam operated contacts.

In Fig. 10 is illustrated the circuit of the key trigger 150 (Fig. 3). Key triggers are used primarily for producing pulses with smooth wave fronts from input pulses that are very likely to contain ragged wave fronts. The operation of circuit breakers, cam contacts and the like are likely to produce transients because of imperfect contact, or contact bounce. Key triggers are usually employed where it is necessary to accept input signals through such devices. The key trigger is operated by feeding a driving voltage through a series of resistors to one or the other of the grid inputs. The input to the key trigger is an integrating circuit composed of two series resistors and a shunt capacitor. Integrating action helps to produce a smooth pulse which promotes positive trigger action if the input pulse remains long enough; therefore, the integrators help prevent transients from effecting the key trigger. Capacitance coupling between grids also desensitizes the key trigger to transients.

Figure 11:
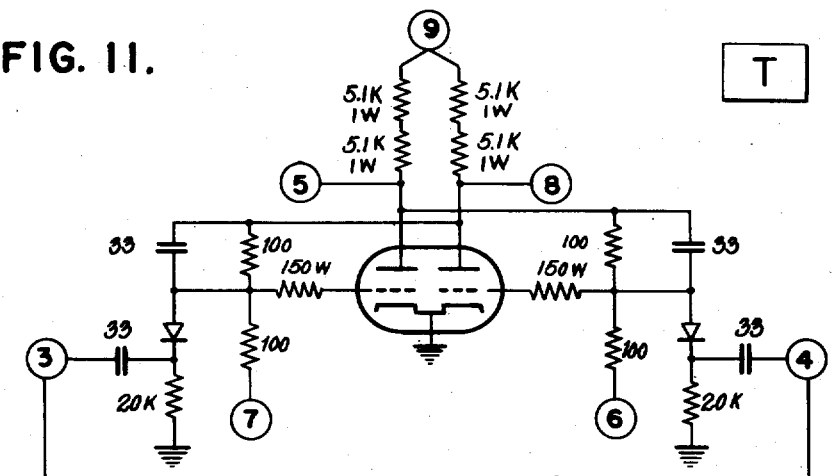
Fig. 11 illustrates both the block symbol and the detailed wiring diagram of an electronic trigger such as used in the input register, for example.

Fig. 11 of the drawings illustrates the circuit of an electronic trigger such as the triggers 190 through 202 (Fig. 2) of the drawings and elsewhere therein. The trigger of Fig. 11 is a bi-stable multivibrator, that is, it remains in either one of two stable states until it is forced by an external signal to assume the other state. This forcing action is called triggering or flipping. Therefore, such triggers have been referred to as "flip-flop" circuits. The bi-stable property of a trigger makes it useful as a storage device, particularly since no dynamic pulses are needed to enable a trigger circuit to continuously store a bit of information.

Basically a trigger circuit resembles two inverter circuits, each of whose plate outputs is coupled to the grid of the other circuit. In one stable state the left tube in Fig. 11 is in full conduction while the right tube is cut "off." In the other state the right tube is in full conduction while the left tube is cut "off." The status of the trigger is changed by applying an external signal to a sensitive point in the circuit. For example, it will be assumed that the right tube is conducting, the right plate is down, that its voltage is considerably less than +150 volts, while the left plate is up (near +150 volts). One method of flipping this circuit is to apply a negative pulse to the left plate. This negative pulse is coupled through the voltage divider to the right grid. Since the right tube is conducting, its grid voltage is high. Therefore, the negative pulse from the left plate causes the right tube to cut "off," and consequently the right plate voltage to rise. This rise is then coupled through another plate-to-grid voltage divider to the left grid, pulling this grid voltage up to ground. The left tube then begins to conduct, pulling its plate voltage down in this shift as the plate in the left tube is in the same direction as the shift applied from an external source. Therefore, the initial action is reinforced, the regeneration continues the voltage trends just initiated. When the left grid voltage reaches ground, it will rise no further and the left plate voltage will fall no further. Also, the right grid will be pulled far enough negative by the fall of the left plate voltage that the right tube will be cut "off" and its right plate will be near +150 volts. The resultant condition is then the second stable state into which the trigger may be pulsed. The input pulse can now be removed without reversing the trigger because the left tube holds the left plate voltage down. The trigger can be flipped either by applying a positive pulse to the down grid (the one corresponding to the cut-off tube) or by applying a negative pulse to the up grid (the one corresponding to the conducting tube). In any case, an input pulse must initiate a regenerating action to cut off the conducting tube and bring the non-conducting tube into full conduction. The tube may be a type 6J6.

Figure 12:
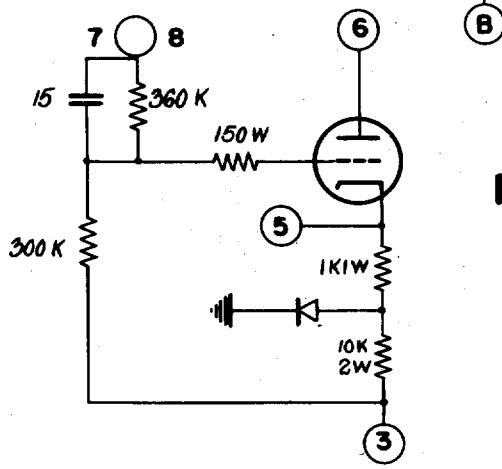
Fig. 12 illustrates both the block symbol and the detailed wiring diagram of a cathode follower.

Fig. 12 illustrates the circuitry of cathode followers used throughout the system. The cathode followers may embody one half of a type 5965 tube. A number preceding the identifying letters CF throughout the block diagram indicates the number of tube halves employed in the cathode follower circuit.

These circuits accept as inputs the high impedance level signal received from the logical AND and OR circuits and provide an output of a similar voltage but at a much lower impedance level which provides sufficient power to transmit signals through circuits having considerable losses. The input to the cathode follower is provided with a divider which adapts it to receive the high level signals from triggers, single shot multivibrators or the like which normally provide signals between levels of +50 and +140 volts. The divider which has its lower end connected to −100 volts reduces the high level signals to the +10 volts and −30 volt levels required for diode switching. The cathode follower may be one half of a type 12AV7 tube.

In Fig. 13, which illustrates both the block symbol and the detailed wiring diagram of an inverter, the tube employed is one half of a type 12AV7 tube as in the case of the cathode follower. The inverter is a circuit that produces a negative shift at its plate when a positive shift is applied to its grid and a positive shift at the plate when a negative shift is applied to the grid. This property makes it useful in inverting logical conditions. The inverter is also a convenient component in that it amplifies the signals and thus it is useful in setting signal levels. The inverter is designed to produce pulses having slow rise and fall times. Although the plate load resistor is large enough to give a little swing, it is not large enough to appreciably affect the signal transitions. The inverter is adapted for use as a trigger pull-over and as such the plate thereof is connected directly to a desired trigger plate.

Figure 14:
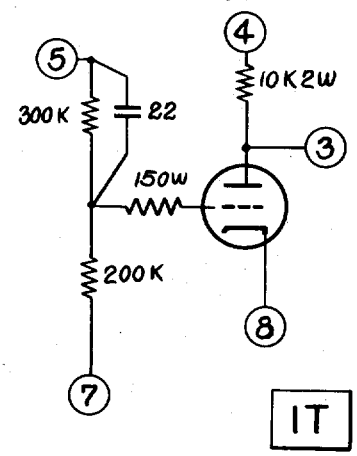
Fig. 14 illustrates both the block symbol and the detailed wiring diagram of a special resistance-capacitance coupled pull-over inverter.

Fig. 14 shows the detailed wiring diagram of a special resistance-capacitance coupled pull-over inverter. The tube may be a type 5965.

Fig. 15 is a −OR circuit. Since it belongs to a class of coincidence circuits also including the −AND circuit of Fig. 18, as well as the AND circuit of Fig. 23, all three of the circuits may be dealt with at this point.

Figure 18:
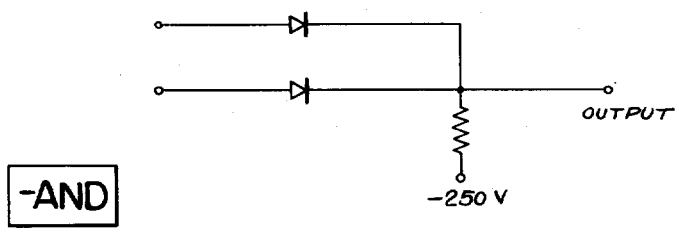
Fig. 18 illustrates both the block symbol and the detailed wiring diagram of a —AND coincidence circuit.
Figure 23:
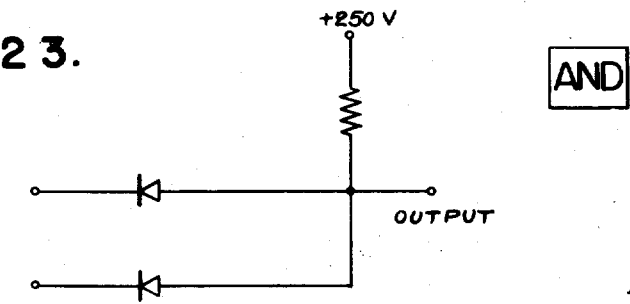
Fig. 23 illustrates both the block symbol and the detailed wiring diagram of an AND coincidence circuit.

AND circuits and OR circuits are crystal diode switching circuits used in the system for gating and isolating purposes. In Figs. 15, 18 and 23 only two inputs have been shown, but any number of inputs may be provided for a single output.

The AND circuit of Fig. 23 is a +AND circuit, while the AND circuit of Fig. 18 and the OR circuit of Fig. 15 are −AND and −OR circuits, respectively.

A +AND circuit and a +OR circuit are characterized by the fact that the positive inputs are effective through diodes which may comprise germanium diodes of standard make such as Sylvania D436A or D437A, to produce a plus volt output. The +AND circuit has the logical property that all the input lines must be positive to produce a positive output, that is the first input and the second input and all other inputs must be positive for a positive output. A +OR circuit has the logical property that if one or another or any number of inputs are positive, the output will be positive. The plus coincidence circuits are so named because they pass positive signals when acting as switches. On the other hand, the −AND and the −OR circuits will pass negative input signals. Consequently the −AND circuit of Fig. 18 will emit a negative output pulse when the input pulse on both diodes is negative. The −OR circuit of Fig. 15 will emit a minus pulse at its output if either of the pulses on the diode inputs are negative.

Figure 16:
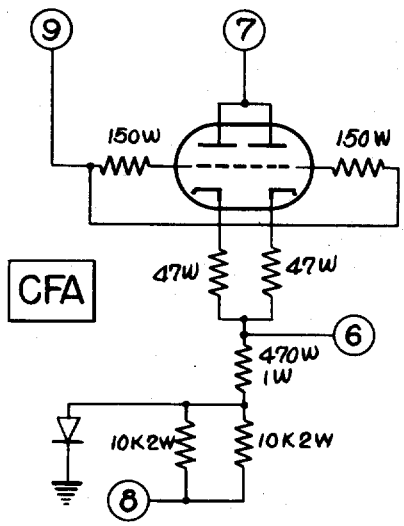
Fig. 16 illustrates both the block symbol and the detailed wiring diagram of a special cathode follower.

Fig. 16 is the detailed circuit diagram of a special cathode follower. This cathode follower circuit differs from the standard cathode follower component circuit in that no input divider is provided. It is, therefore, adapted to receive the signal outputs of diode switching circuits such as the AND and OR circuits just described, and it acts as an imperance matching device to permit driving heavily loaded circuits without loading the diode switching circuits themselves. The tube may be a type 12AV7.

Figure 17:
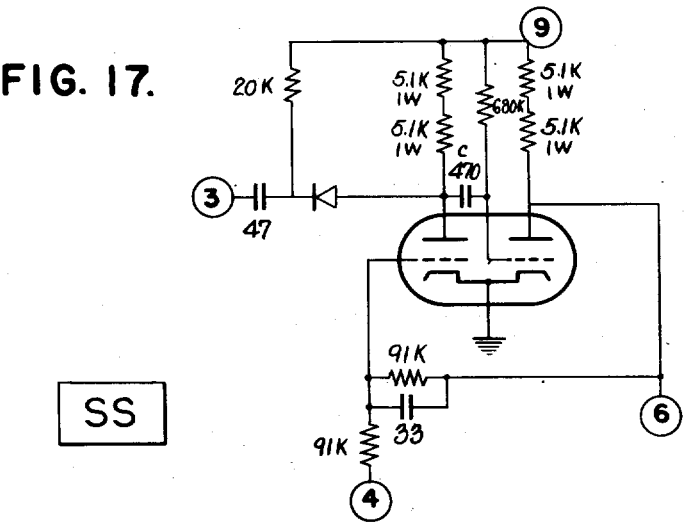
Fig. 17 illustrates both the block symbol and the detailed wiring diagram of a single shot multivibrator used in the system for timing purposes.

Fig. 17 is the detailed circuit diagram of a typical single shot multivibrator, several of which are used in the system for producing timing pulses. The single shot multivibrator resembles a trigger circuit in that it may be flipped into a certain state, but it then returns to its previous state after a predetermined time without being pulsed from an external source. Its normal state may be referred to as its stable state, and its abnormal state may be referred to as its quasi-stable state, for it remains stable in its quasi-stable state until its predetermined time period has elapsed. In the stable state the left triode is cut off and the right triode is conducting heavily. The most common method for firing a single shot multivibrator is by plate pull-over. When using plate pull-over the left plate of the single shot is connected to the plate of a pull-over inverter, the load resistor for the left plate also acting as the load resistor for the pull-over inverter. The duration of the single shot output pulse is largely dependent upon the discharging of the capacitor connected between the left plate and the right grid. The resistance and capacitor may be varied to determine the duration of the pulse, and therefore they are referred to as the timing resistor and the timing capacitor. The larger the resistor and the capacitor the more time is required for the right grid voltage to rise. The single shot multivibrator may embody a 12AV7 type tube.

Figure 22:
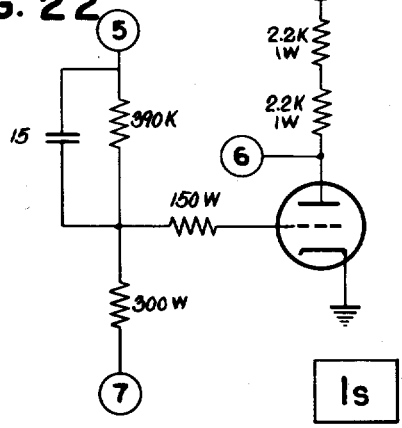
Fig. 22 illustrates both the block symbol and the detailed wiring diagram of a special inverter.
Figure 21:
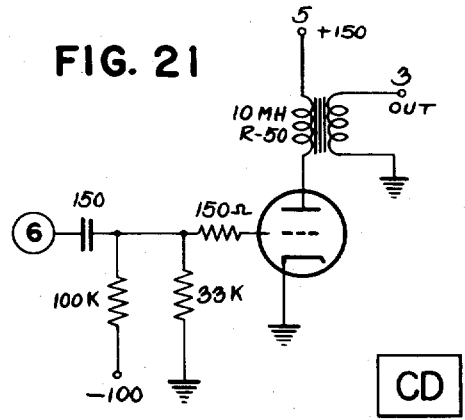
Fig. 21 illustrates both the block symbol and the detailed wiring diagram of a core driver.

Fig. 22 is the detailed circuitry of a special inverter which has a divider input for use with high level signals, and it is particularly intended for applications requiring very fast rise and fall times. It, therefore, uses a type 5687 tube and a low value plate resistor as well as capacitor compensation in the input divider.

The foregoing specific description of the circuitry and the components thereof is by way of example only. It will be evident to those skilled in the art that the principles of the invention may be applied in various forms and with a variety of modified or even different components. It is, therefore, desired that the practice of the invention be not limited other than by such limitations as may be imposed thereon in the claims that are to follow.

What is claimed is:

1. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, means for impressing a half-current on selected ones of said digit windings during each entry operation, means for impressing a half-current on successive digit entry windings during successive entry operations whereby cores at the intersection of such impulse

17 windings are magnetized, and means for impressing a core discharging pulse on said read-out windings in serial order whereby an output pulse is generated on said sensing winding on magnetized cores discharged by said read-out pulses.

2. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each colunm, record controlled means for impressing a half-current on selected ones of said digit windings during each entry operation, means for impressing a half-current on successive digit entry windings during successive entry operations whereby cores at the intersection of such impulse windings are magnetized, and reproducer controlled means for impressing a core discharging pulse on said read-out windings in serial order whereby an output pulse is generated on said sensing winding on magnetized cores discharged by said read-out pulses.

3. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, magnetic record controlled means for impressing a half-current on selected ones of said digit windings during each entry operation, means for impressing a half-current on successive digit entry windings during successive entry operations whereby cores at the intersection of such impulse windings are magnetized, and a pulse emitter controlled by a reproducer for impressing a core discharging pulse on said read-out windings in serial order whereby an output pulse is generated on said sensing winding on magnetized cores discharged by said read-out pulses.

4. A magnetic core register comprising a plurality of magnetic cores arranged in a matrix to represent data disposed in rows and columns, a core digit winding for the cores of each row, a digit entry winding for the cores of each column, a core read-out winding for the cores of each row, a core sensing winding for the cores of each column, means for impressing a half-current on selected ones of said digit windings during each entry operation, means for impressing a half-current on successive digit entry windings during successive entry operations whereby cores at the intersection of such impulse windings are magnetized, and means for impressing a core discharging pulse on said read-out windings in serial order whereby an output pulse is generated on said sensing winding on magnetized cores discharged by said read-out pulses.

5. A register comprising a plurality of magnetizable core elements, a core digit winding for each of said cores, a digit entry winding for each of said cores, a core read-out winding for each of said cores, a core sensing winding for each of said cores, means for impressing a half-current on said digit windings during each entry operation, means for impressing a half-current on successive digit entry windings during successive entry operations whereby cores at the intersection of such impulse windings are magnetized, means for impressing a core discharging pulse on said read-out windings whereby an output pulse is generated on said sensing windings of magnetized cores discharged by said read-out pulses, a column stepping core for each of said digit entry windings connected to the sensing windings of the immediately preceding storage core, a core discharging winding connected to each of said stepping cores which when pulsed will discharge the charge of a core thereon and thereby induce an output pulse in the sensing windings,

18 and means responsive to the pulse so produced for charging the stepping core of the next following column.

6. A register comprising a plurality of magnetizable core elements, common core digit windings connecting said cores, a digit entry winding for each of said cores, common core read-out windings connecting said cores, a core sensing winding connected to each of said cores, means for impressing a half-current on said digit windings during each entry operation, means for impressing a half-current on successive digit entry windings during successive entry operations whereby cores at the intersection of such impulse windings are magnetized, means for impressing a core discharging pulse on said read-out windings whereby an output pulse is generated on said sensing windings of magnetized cores discharged by said read-out pulses, a column stepping core connected to each of said digit entry windings and to the sensing windings of the immediately preceding storage core, a core discharging winding connected to each of said stepping cores which when pulsed will discharge the charge of a core thereon, and thereby induce an output pulse in the sensing windings and means responsive to the pulse so produced for charging the stepping core of the next following column.

7. A register comprising a plurality of magnetizable core elements, a core digit winding for each of said cores, a digit entry winding for each of said cores, a core read-out winding for each of said cores, a core sensing winding for each of said cores, means for impressing a half-current on said digit windings during each entry operation, means for impressing a half-current on successive digit entry windings during successive entry operations whereby cores at the intersection of such impulse windings are magnetized, means for impressing a core discharging pulse on said read-out windings whereby an output pulse is generated on said sensing windings of magnetized cores discharged by said read-out pulses, a column stepping core for each of said digit entry windings and to the sensing windings of the immediately preceding storage core, a core discharging winding connected to each of said stepping cores which when pulsed will discharge the charge of a core thereon and thereby induce an output pulse in the sensing windings, and an electron tube responsive to the pulse so produced for applying a full charging current to the stepipng core of the next following column.

8. A register comprising a plurality of magnetizable core elements, common core digit windings connecting said cores, a digit entry winding for each of said cores, common core read-out windings connecting said cores, a core sensing winding connected to each of said cores, means for impressing a half-current on said digit windings during each entry operation, means for impressing a half-current on successive digit entry windings during successive entry operations whereby cores at the intersection of such impulse windings are magnetized, means for impressing a core discharging pulse on said read-out windings whereby an output pulse is generated on said sensing windings of mangetized cores discharged by said read-out pulses, a column stepping core connected to each of said digit entry windings and to the sensing windings of the immediately preceding storage core, a separate core discharging winding connected to stepping cores in alternate columns which when pulsed will discharge the charge of a core thereon and thereby induce an output pulse in the sensing windings, means for impressing core discharging pulses alternately on said discharging windings, and means responsive to the pulse so produced for charging the stepping core of the next following column.

9. A register comprising a first and a second magnetizable data storage core, a digit winding for each of said cores, a digit entry winding and a sensing winding for each of said cores, means for simultaneously impressing a half-current on said digit windings during each entry operation, means for impressing a half-current first on said first storage core digit entry winding and then on said second storage core digit entry winding comprising, a stepping core connected to the digit entry winding of said first data storage core whereby the same is charged upon application of a half-current to the digit entry winding of said first data storage core, a connection between said stepping core and the sensing winding of said second data storage core, means for discharging said stepping core and thereby inducing an output pulse in the sensing winding of said second storage core, and means responsive to the pulse so produced for impressing a half-current on the digit entry winding of said second storage core.

10. A register comprising a first and a second magnetizable data storage core, a digit winding for each of said cores, a digit entry winding and a sensing winding for each of said cores, means for simultaneously impressing a half-current on said digit windings during each entry operation, means for impressing a half-current first on said first storage core digit entry winding and then on said second storage core digit entry winding comprising, a stepping core connected to the digit entry winding of said first data storage core whereby the same is charged upon application of a half current to the digit entry winding of said first data storage core, a connection between said stepping core and the sensing winding of said second data storage core, means for discharging said stepping core and thereby inducing an output pulse in the sensing winding of said second storage core, and an electron tube responsive to the pulse so produced for impressing a half-current on the digit entry winding of said second storage core.

11. A register comprising a first and a second magnetizable data storage core, common digit windings connecting said cores, a digit entry winding and a sensing winding connected to each of said cores, means for simultaneously impressing a half-current on said digit windings during each entry operation, means for impressing a half-current first on said first storage core digit entry winding and then on said second storage core digit entry winding comprising, a stepping core connected to the digit entry winding of said first data storage core whereby the same is charged upon application of a half-current to the digit entry winding of said first data storage core, a connection between said stepping core and the sensing winding of said second data storage core, means for discharging said stepping core and thereby inducing an output pulse in the sensing winding of said second storage core, and an electron tube responsive to the pulse so produced for impressing a half-current on the digit entry winding of said second storage core.

12. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, means for impressing a half-current on selected ones of said digit windings during each entry operation, means for impressing a half-current on successive digit entry windings during successive entry operations whereby cores at the intersection of such impulsed windings are magnetized, means for impressing a core discharging pulse on said read-out windings in serial order whereby an output pulse is generated on said sensing windings of magnetized cores discharged by said read-out pulses, a column stepping core connected to each of said digit entry windings and to the sensing windings of the immediately preceding storage core, a core discharging windings connected to each of said stepping cores which when pulsed will discharge the charge of a core thereon and thereby induce an output voltage in the sensing winding, and means responsive to the voltage so produced for charging the stepping core of the next following column.

13. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, means for impressing a half-current on selected ones of said digit windings during each entry operation, means for impressing a half-current on successive digit entry windings during successive entry operations whereby cores at the intersection of such impulsed windings are magnetized, means for impressing a core discharging pulse on said read-out windings in serial order whereby an output pulse is generated on said sensing windings of magnetized cores discharged by said read-out pulses, a column stepping core connected to each of said digit entry windings and to the sensing windings of the immediately preceding storage core, a core discharging winding connected to each of said stepping cores which when pulsed will discharge the charge of a core thereon and thereby induce an output voltage in the sensing winding, and common means responsive to voltage induced in one of said sensing windings by discharge of a core by a pulse on its read-out winding and to the voltage induced in said sensing winding by discharge of a stepping core.

14. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, means for impressing a half-current on selected ones of said digit windings during each entry operation, means for impressing a half-current on successive digit entry windings during successive entry operations whereby cores at the intersection of such impulsed windings are magnetized, means for impressing a core discharging pulse on said read-out windings in serial order whereby an output pulse is generated on said sensing windings of magneized cores discharged by said read-out pulses, a column stepping core connected to each of said digit entry windings and to the sensing windings of the immediately preceding storage core, a core discharging winding connected to each of said stepping cores which when pulsed will discharge the charge of a core thereon and thereby induce an output voltage in the sensing winding, and a common electron tube responsive to voltage induced in one of said sensing windings by discharge of a core by a pulse on its read-out winding and to the voltage induced in said sensing winding by discharge of a stepping core.

15. A magnetic core register comprising a plurality of magnetic cores arranged in a matrix to represent data disposed in rows and columns, common core digit windings connecting the cores of each row, common digit entry windings connecting the cores of each column, common core read-out windings connecting the cores of each row, common core sensing windings connecting the cores of each column, means for impressing a half-current on selected ones of said digit windings during each entry operation, means for impressing a half-current on successive digit entry windings during successive entry operations whereby cores at the intersection of such impulsed windings are magnetized, means for impressing a core discharging pulse on said read-out windings in serial order whereby an output pulse is generated on said sensing windings of magnetized cores discharged by said read-out pulses, a column stepping core connected to each of said digit entry windings and to the sensing windings of the immediately preceding storage core, a core discharging windings connected to each of said stepping cores which when pulsed will discharge the charge of a core thereon and thereby induce an output voltage in the sensing winding, a common electron tube responsive to voltage induced in one of said sensing windings by discharge of a core by a pulse on its read-out winding and to the voltage induced in said sensing winding by discharge of a stepping core, and means for switching the output of said electron tube to a data reproducing control magnet when energized by voltage included on said sensing winding as a result of a read-out pulse and to said digit entry winding when energized by voltage induced on said sensing winding as a result of a stepping core discharge pulse.

16. In a data processing machine a magnetic core register comprising a plurality of magnetic cores arranged in a matrix to represent data disposed in rows and columns, common core digit windings connnecting the cores of each row, common digit entry windings connecting the cores of each column, column core read-out windings connecting the cores of each row, common core sensing windings connecting the cores of each column, record controlled means for impressing a half-current on selected ones of said digit windings during each entry operation, means for impressing a half-current on successive digit entry windings during successive entry operations whereby cores at the intersection of such impulse windings are magnetized, and reproducer controlled means for impressing a core discharging pulse on said read-out windings in serial order.

17. In a data processing machine a magnetic core register comprising a plurality of magnetic cores arranged in a matrix to represent data disposed in rows and columns, common core digit windings connecting the cores of each row, common digit entry windings connecting the cores of each column, column core read-out windings connecting the cores of each row, common core sensing windings connecting the cores of each column, means for sensing a record in which characters are represented in a multi-bit code, a register having a number of orders corresponding to the number of bits comprising the code utilized and being adapted to receive the bits comprising a complete character in somewhat serial order, a connection between each of said register orders and a corresponding digit winding of said matrix, means for simultaneously discharging said register orders into said digit windings, means for impressing a half-current on successive digit entry windings during successive entry operations whereby cores at the intersection of such impulses windings are magnetized, and means under control of a record reproduced for impressing a core discharging pulse on said read-out windings in serial order, whereby an output pulse is generated on said sensing windings of magnetized cores discharged by said read-out pulses.

18. In a data processing machine a magnetic core register comprising a plurality of magnetic cores arranged in a matrix to represent data disposed in rows and columns, common core digit windings connecting the cores of each row, common digit entry windings connecting the cores of each column, column core read-out windings connecting the cores of each row, common core sensing windings connecting the cores of each column, means for sensing a magnetic record tape in which characters are represented in a multi-bit code, a register having a number of orders corresponding to the number of bits comprising the code utilized and being adapted to receive the bits comprising a complete character in somewhat serial order, a connection between each of said register orders and a corresponding digit winding of said matrix, means for simultaneously discharging said register orders into said digit windings, means for impressing a half-current on successive digit entry windings during successive entry operations whereby cores at the intersection of such impulsed windings are magnetized, and an emitter under control of a record reproducer for impressing a core discharging pulse on said read-out windings in serial order. whereby an output pulse is generated on said sensing windings of magnetized cores discharged by said read-out pulses.

No references cited.